United States Patent
Woundy (10) Patent No.: US 7,046,659 B1
(45) Date of Patent: May 16, 2006

(54) CALL SIGNALING APPROACH TO USER SELF-PROVISIONING ON VOIP USING A TOUCH-TONE INTERFACE

(75) Inventor: Richard Woundy, North Reading, MA (US)

(73) Assignee: Cisco Technology, Inc., San Jose, CA (US)

( * ) Notice: Subject to any disclaimer, the term of this patent is extended or adjusted under 35 U.S.C. 154(b) by 989 days.

(21) Appl. No.: 09/898,801

(22) Filed: Jul. 3, 2001

(51) Int. Cl.
*H04L 12/24* (2006.01)

(52) U.S. Cl. ..................... 370/352; 370/356; 379/88.17

(58) Field of Classification Search ................ 370/285, 370/251–256, 363, 395.52, 395.54, 401, 370/402, 493–495, 522; 379/88.17, 88.18, 379/93.03, 93.26, 93.31; 709/203, 218, 219, 709/230
See application file for complete search history.

(56) References Cited

U.S. PATENT DOCUMENTS

| | | | |
|---|---|---|---|
| 5,708,654 A | 1/1998 | Arndt et al. ................. 370/242 |
| 5,724,510 A | 3/1998 | Arndt et al. ............. 395/200.5 |
| 5,790,548 A | 8/1998 | Sistanizadeh et al. ....... 370/401 |
| 5,812,819 A | 9/1998 | Rodwin et al. ............. 395/500 |
| 5,835,723 A | 11/1998 | Andrews et al. ........ 395/200.56 |
| 5,848,233 A | 12/1998 | Radia et al. ........... 395/187.01 |
| 5,862,345 A | 1/1999 | Okanoue et al. ....... 395/200.68 |
| 5,872,524 A | 2/1999 | Iida ........................ 340/825.52 |
| 6,023,464 A | 2/2000 | Woundy ..................... 370/352 |
| 6,614,781 B1 * | 9/2003 | Elliott et al. ................. 370/352 |
| 6,674,745 B1 * | 1/2004 | Schuster et al. ............ 370/352 |
| 6,744,759 B1 * | 6/2004 | Sidhu et al. ................. 370/356 |
| 6,775,273 B1 * | 8/2004 | Kung et al. .................. 370/356 |
| 6,856,616 B1 * | 2/2005 | Schuster et al. ............ 370/352 |

* cited by examiner

*Primary Examiner*—Ajit Patel
*Assistant Examiner*—John Shew
(74) *Attorney, Agent, or Firm*—Hickman Palermo Truong & Becker LLP (57) ABSTRACT

A method for providing self-provisioning of VoIP telephony to a subscriber of a VoIP telephony service is disclosed. An un-provisioned residential gateway that is associated with the subscriber is instructed to collect a subscriber numeric identity that uniquely identifies the subscriber and a Personal Identification Number (PIN) information that are associated with the subscriber. An example of a subscriber numeric identity that uniquely identifies the subscriber is the subscriber's E.164 address. The E.164 address and Personal Identification Number (PIN) information is verified. A source IP address that is associated with one or more Media Gateway Control Protocol (MGCP) messages that are sent by the residential gateway is used as a residential gateway IP address for the residential gateway. The residential gateway IP address is then used to provision the residential gateway that is associated with the subscriber. According to certain embodiments, the above steps are carried out by a call agent from a self-provisioning system of a provider of the VoIP telephony services. One or more VoIP connections are established between the residential gateway and an announcement server. The announcement server sends VoIP messages through the VoIP connections to the subscriber via the residential gateway. A protocol server offers the residential gateway, via a Dynamic Host Configuration Protocol (DHCP) server, a limited access IP address, a location of one or more Domain Name System (DNS) servers, and a Media Gateway Protocol (MGCP) endpoint name of the call agent from the self-provisioning system.

17 Claims, 6 Drawing Sheets

CALL SIGNALING APPROACH TO USER SELF-PROVISIONING ON VOIP USING A TOUCH-TONE INTERFACE

FIELD OF INVENTION

The present invention relates to provisioning end user interfaces to Voice over Internet Protocol (VoIP) networks. The invention relates more specifically to a call signaling approach to user self-provisioning of VoIP using a touch-tone interface with other authentication and authorization mechanisms.

BACKGROUND OF THE INVENTION

Cable and fixed wireless service providers have made substantial investments to create Internet Protocol ("IP") infrastructure. IP infrastructure comprises packet networks. As a natural consequence, such providers wish to leverage their existing IP infrastructure by offering telephony services that use packet networks to prospective residential subscribers. In other words, cable and fixed wireless services providers would like to mass market VoIP telephony services to such subscribers. In order to mass-market telephony services to subscribers, cable and fixed wireless service providers need mechanisms by which the subscribers are able register for and activate VoIP telephony services with relative ease.

The vast majority of subscribers are unlikely to need high-speed access for accessing IP networks. In one approach, providing VoIP telephony services required manual installation at the residence by a service person working for the provider. For example, the subscriber or an installer that works for the provider uses a VoIP-cable modem to call a technician who is located at the provider's office (back-office technician). The technician then manually enters information that is required for provisioning into the provider's provisioning delivery system. For example, the technician may enter the MAC address of the cable modem into the Telecordia Delivery/Cisco Element Manager system. The disadvantage to this approach is it requires one back-office technician for each subscriber/installer that may be simultaneously performing the provisioning operation.

In another approach, a subscriber or installer that works for the provider uses a computer to access the provider's online subscriber registration center in order to provision the VoIP interfaces on the subscriber's broadband modem. A commercial example of an online subscriber registration center is the Cisco Subscriber Registration Center (CSRC). The disadvantage to this approach is that it requires a computer for the provisioning operation, which may be unavailable if the subscriber does not own a computer or unwieldy if the installer has to resort to carrying the computer from house to house.

In yet another approach, a subscriber uses the touch tone interface on a telephone to provision VoIP interfaces through communication with an Interactive Voice Response (IVR) system. The disadvantage to this approach is that most IVR systems are unaware of the IP location of the broadband modem that is to be provisioned. Moreover, IVR systems are expensive.

Based on the foregoing, there is a clear need for an improved and more efficient way to provide for provisioning VoIP interfaces, which provisioning can be performed by the subscriber.

SUMMARY OF THE INVENTION

The foregoing needs, and other needs that will become apparent for the following description, are achieved in the present invention, which comprises, in one aspect, a method for providing self-provisioning of VoIP telephony to a subscriber of a VoIP telephony service. A residential gateway that is associated with the subscriber and that has not been provisioned is instructed to collect an E.164 address that is allocated to the subscriber. The residential gateway is also instructed to collect a Personal Identification Number (PIN) information that is associated with the subscriber. The E.164 address and Personal Identification Number (PIN) are verified. A source IP address that is associated with one or more Media Gateway Control Protocol (MGCP) messages that are sent by the residential gateway is used as a residential gateway IP address for the residential gateway. The residential gateway IP address is then used to provision the residential gateway that is associated with the subscriber.

According to certain features of this aspect, the above steps are carried out by a call agent from a self-provisioning system of a provider of the VoIP telephony services. One or more VoIP connections are established between the residential gateway and an announcement server. The announcement server sends VoIP messages through the VoIP connections to the subscriber via the residential gateway. The VoIP messages instruct the subscriber to dial in a provisioning access number, the E.164 address and Personal Identification Number (PIN). The call agent from the self-provisioning system verifies the E.164 address and Personal Identification Number (PIN) using an authentication database.

According to other features of this aspect, a protocol server offers the residential gateway, via a Dynamic Host Configuration Protocol (DHCP) server, a limited access IP address, a location of one or more Domain Name System (DNS) servers, and a Media Gateway Protocol (MGCP) endpoint name of the call agent from the self-provisioning system.

Other aspects and features will become apparent from the following description. For example, in other aspects, the invention encompasses a computer apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for establishing class of service configuration in a network device of a broadband cable network using Dynamic Host Configuration Protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
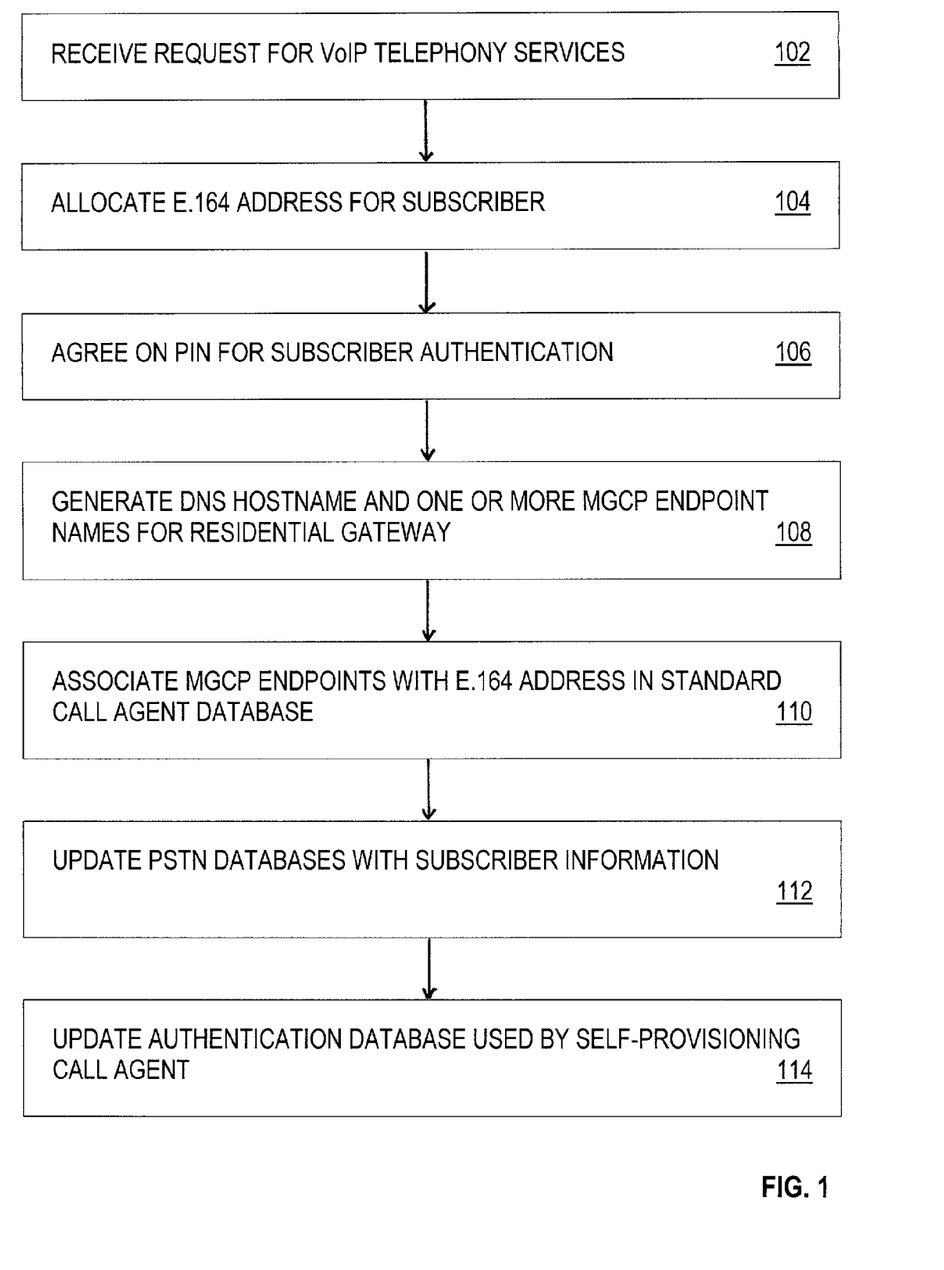
FIG. 1 is a flowchart that illustrates preparatory steps that may be performed before the self-provisioning of a residential gateway that has not been provisioned begins.

The description is presented according to the following general outline:

1.0 PREPARATORY STEPS BEFORE SELF-PROVISIONING OF RESIDENTIAL GATEWAY
2.0 SELF-PROVISIONING OF RESIDENTIAL GATEWAY
   2.1 ARCHITECTURAL OVERVIEW AND OPERATIONAL CONTEXT
   2.2 METHOD FOR SELF-PROVISIONING OF RESIDENTIAL GATEWAY BY SUBSCRIBER
3.0 HARDWARE OVERVIEW
4.0 EXTENSIONS AND ALTERNATIVES 1.0 Preparatory Steps Before Self-Provisioning of Residential Gateway FIG. 1 is a flowchart that illustrates preparatory steps that may be performed before the self-provisioning of a residential gateway that has not been provisioned begins.

At block 102 of FIG. 1, a request for VoIP service is received. For example, a subscriber contacts a provider of VoIP telephony services to express a desire for telephony services. The provider of VoIP telephony services is herein referred to as "provider". For example, the subscriber may contact the provider by telephone or through the provider's website. The provider verifies the subscriber's address and financial information.

Once the provider decides to provide services to the subscriber, then at block 104, the provider allocates an address conforming to ITU standard E.164 for the subscriber from an existing pool of unallocated numbers. An example of an E.164 address is a ten-digit telephone number. Alternatively, the subscriber may request transfer of an existing telephone number to the provider. For example, the subscriber may contact an existing telephony provider to arrange for the transfer.

At block 106, the provider and the subscriber agree on a Personal Identification Number (PIN) for the purpose of authenticating the subscriber during the process of self-provisioning of a residential gateway that is associated with the subscriber, and that is to be provisioned with the provider's services. A residential gateway is a type of telephony gateway. Telephony gateways provide conversion between the audio signals carried on telephone circuits and data packets that are carried over a packet network. A residential gateway provides a traditional analog RJ-11 interface to a VoIP network. Examples of residential gateways include cable modem/cable set-top boxes, xDSL devices, and broadband wireless devices. The residential gateway that will be associated with the subscriber, and that is to be provisioned with the provider's services is herein simply referred to as the residential gateway.

At block 108, the provider generates a Domain Name System (DNS) hostname and one or more Media Gateway Control Protocol (MGCP) endpoint names for the residential gateway. At block 110, the provider associates the MGCP endpoint names with the E.164 address that was allocated to the subscriber in a database of a standard call agent. The standard call agent is the call agent that controls the residential gateway once the residential gateway has been provisioned by completing the self-provisioning process that is described herein.

At block 112, the provider updates one or more Public Switched Telephone Network (PSTN) databases with information associated with the subscriber. For example, the provider may enter the subscriber information into an order entry system. The order entry system would write the subscriber information into one or more relational database systems that are used for subscriber billing and management. Examples of PSTN databases that store information associated with the subscribers includes E-911 subscriber databases, subscriber billing information databases, database associated with authentication systems, etc.

At block 114, the provider updates an authentication database used by a specialized call agent of the self-provisioning system that is described in greater detail herein. The authentication database stores the E.164 address and the PIN of the subscriber.

2.0 Self-Provisioning of a Residential Gateway

2.1 Architectural Overview and Operational Context

Figure 2:
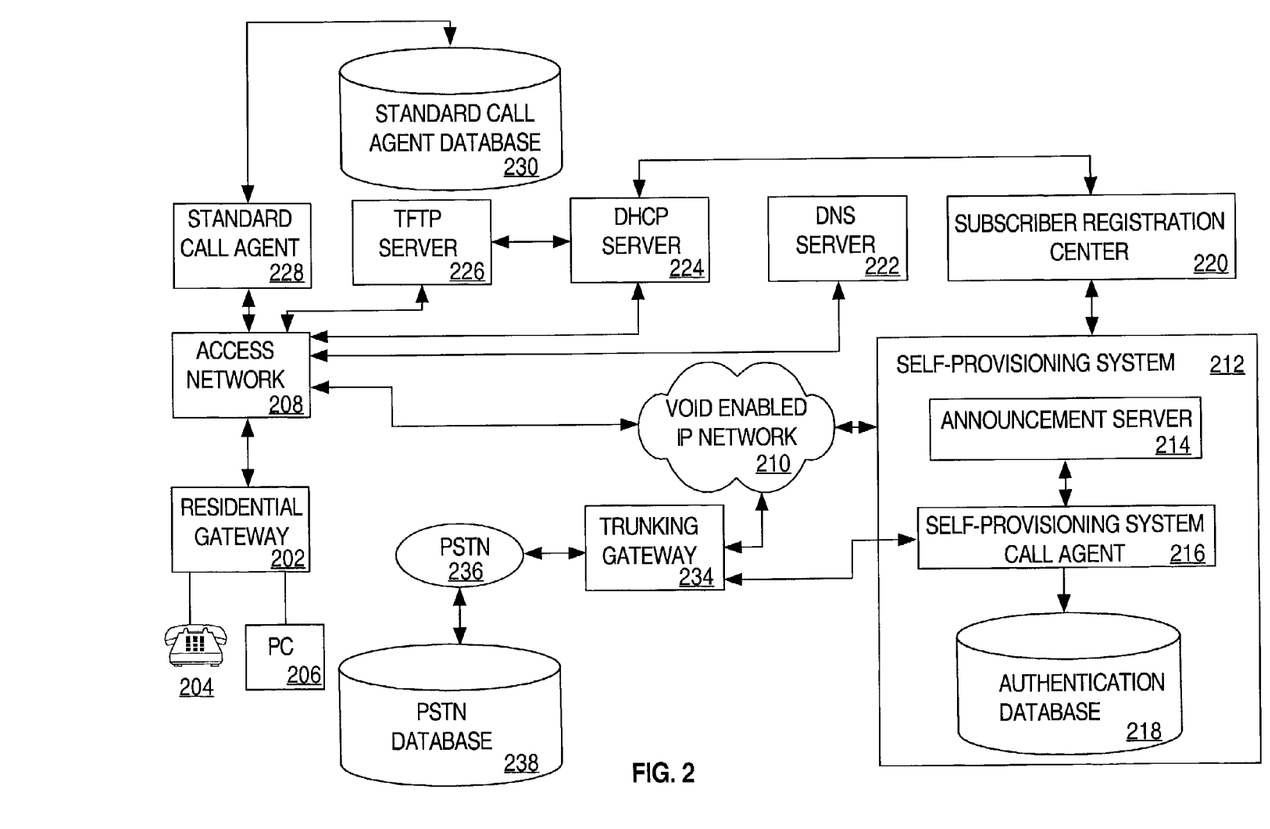
FIG. 2 is a simplified block diagram that illustrates an architectural overview and example operational context for a self-provisioning system.

FIG. 2 is a simplified block diagram that illustrates an architectural overview and example operational context for a self-provisioning system that allows a subscriber to self-provision the residential gateway.

A telephone device 204 and a personal computer 206 are each communicatively coupled to a residential gateway 202. A subscriber, not shown in FIG. 2, of VoIP telephony services, is associated with residential gateway 202, telephone 204 and personal computer 206. Residential gateway 202 is communicatively coupled to an access network 208, and implements MGCP, in one embodiment. In certain embodiments, access network 208 is a broadband access network. Examples of residential gateways that may benefit from the approaches described herein include the Cisco 924 Cable Modem, fixed wireless modems, DSL modems, packet cable modems that use the DOCSIS standard, etc.

Access network 208 is communicatively coupled to a VoIP-enabled IP network 210. For example, network 210 is a packet-switched IP network that includes routers, switches and other elements that host gatekeepers, gateways, call agents and other elements as defined in MGCP. Further, access network 208 is communicatively coupled to a Domain Name Service server 222, a Dynamic Host Configuration Protocol server 224, a Trivial File Transfer Protocol (TFTP) server 226, and a standard call agent 228. Standard call agent 228 is communicatively coupled to a standard call agent database 230. Standard call agent database 230 stores mapping information between a given E.164 address and its corresponding endpoint name.

VoIP-enabled IP backbone 210 is communicatively coupled to a self-provisioning system 212, and a trunking gateway 234. Trunking gateway 234 provides an interface between a telephone network such as PSTN 236 and a VoIP network such as network 210. Trunking gateways typically manage a large number of digital circuits. Trunking gateway 234 is communicatively coupled to PSTN 236, which in turn is communicatively coupled to PSTN database 238. PSTN database 238 stores information associated with the subscriber such as billing information, and may be located, for example, at a Service Control Point.

Self-provisioning system 212 is communicatively coupled to a subscriber registration center 220. Self-provisioning system 212 comprises an announcement server 214 and a self-provisioning system call agent 216. Self-provisioning system call agent 216 is communicatively coupled to authentication database 218. Authentication database 218 stores the E.164 address and the PIN of the subscriber.

Self-provisioning system call agent 216 is a call signaling server that detects events, such as "off-hook", "on-hook" or "flash," of a telephone receiver. In one embodiment, call agent 216 is implemented as an MGCP call agent. Self-provisioning system call agent 216 is used to collect information from residential gateway 202. For example, self-provisioning system call agent 216 may collect account numbers, PINs, or service selection information that is dialed by a subscriber that is associated with residential gateway 202. Self-provisioning system call agent 216 allows two-way communication between itself and the subscriber. Further, self-provisioning system call agent 216 enables self-provisioning system 212 to determine the IP location of residential gateway 202.

Announcement server 214 is a type of telephony gateway. Announcement server 214 transmits audio clips to communicate with the subscriber via residential gateway 202. For example, announcement server 214 may play a specified announcement as directed by an MGCP command from self-provisioning system call agent 216. MGCP is a protocol, defined in RFC 2705, for controlling telephony gateways from external control elements over a packet network. Thus, MGCP commands are used to control telephony gateways such as residential gateway 202 and announcement server 214.

In certain embodiments, announcement server 214 is a subsystem of self-provisioning call agent 216. In certain other embodiments, self-provisioning system call agent 216 and announcement server 214 may exist as subsystems of standard call agent 228.

Subscriber registration center 220 is a provisioning service that can obtain network addresses for subscribers from DHCP server 224, and direct various un-provisioned residential gateways to self-provisioning system call agents and announcement servers. For example, subscriber registration center 220 is able to determine and communicate, to residential gateway 202 the MGCP endpoint name and DNS hostname of self-provisioning system 212. Also, subscriber registration center 220 is able to communicate to residential gateway 202, the location of DNS server 222, and the IP address of residential gateway 202. The communication between subscriber registration center 220 and other elements is facilitated by DHCP server 224 and TFTP server 226. For example, residential gateway 202 uses a combination of DHCP, TFTP, and/or Simple Network Management Protocol (SNMP) Set Protocol Data Units (PDUs).

Further, subscriber registration center 220 is able to identify a given residential gateway by the residential gateway's MAC address using the current IP address of the residential gateway and therefore subscriber registration center 220 is able to direct provisioned residential gateways to the standard call agent to enable VoIP calls and services. A commercial example of subscriber registration center 220 is Cisco Subscriber Registration Center, from Cisco Systems, Inc.

2.2 Method for Self-Provisioning of a Residential Gateway

Figure 3A:
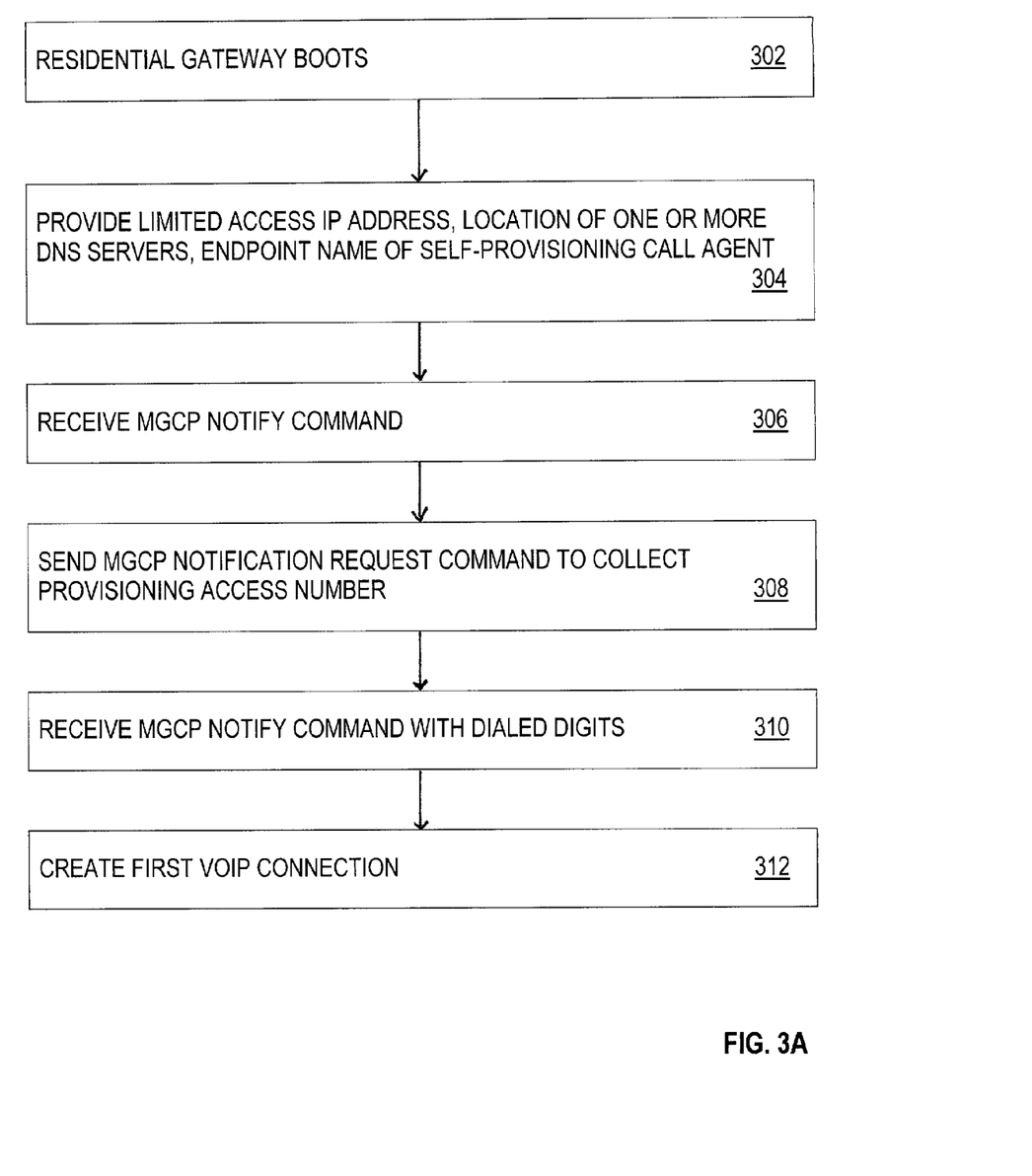
FIG. 3A is a flowchart of a portion of a method for self-provisioning a residential gateway that has not been provisioned.
Figure 3B:
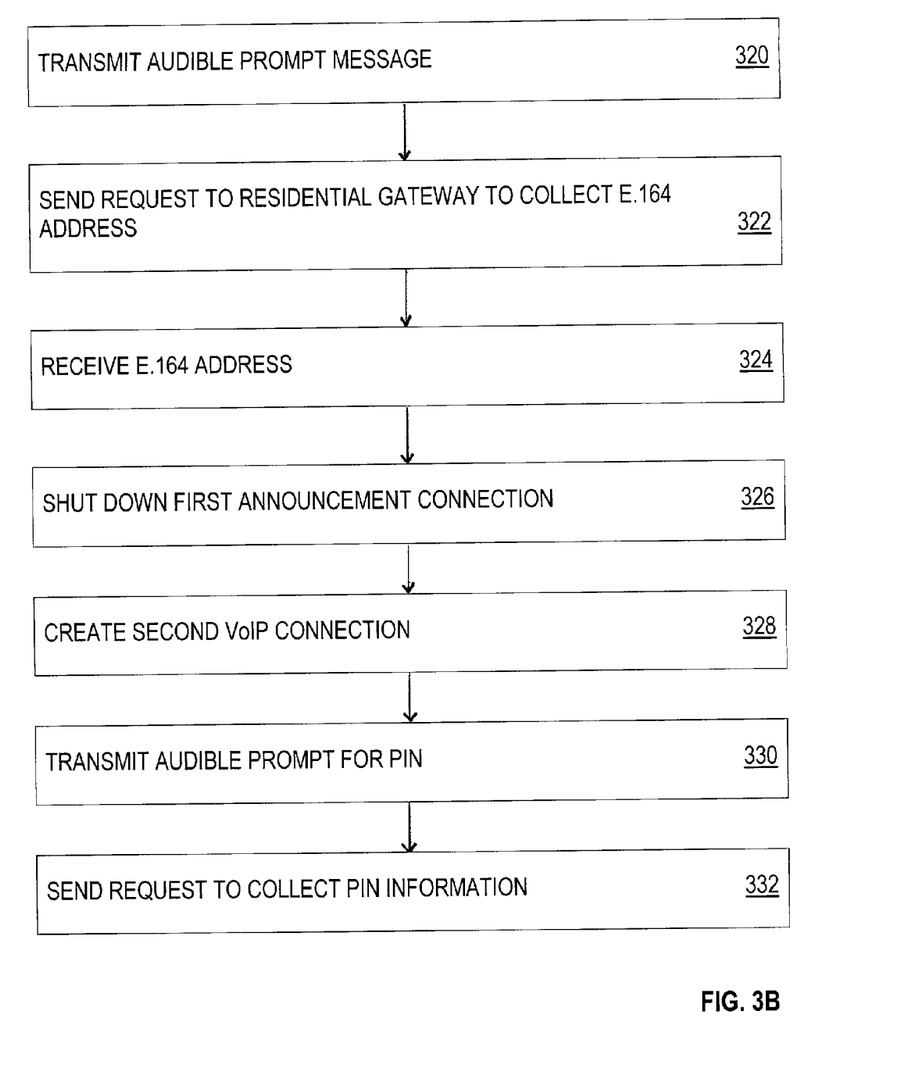
FIG. 3B is a flowchart of further steps in the method of FIG. 3A.
Figure 3C:
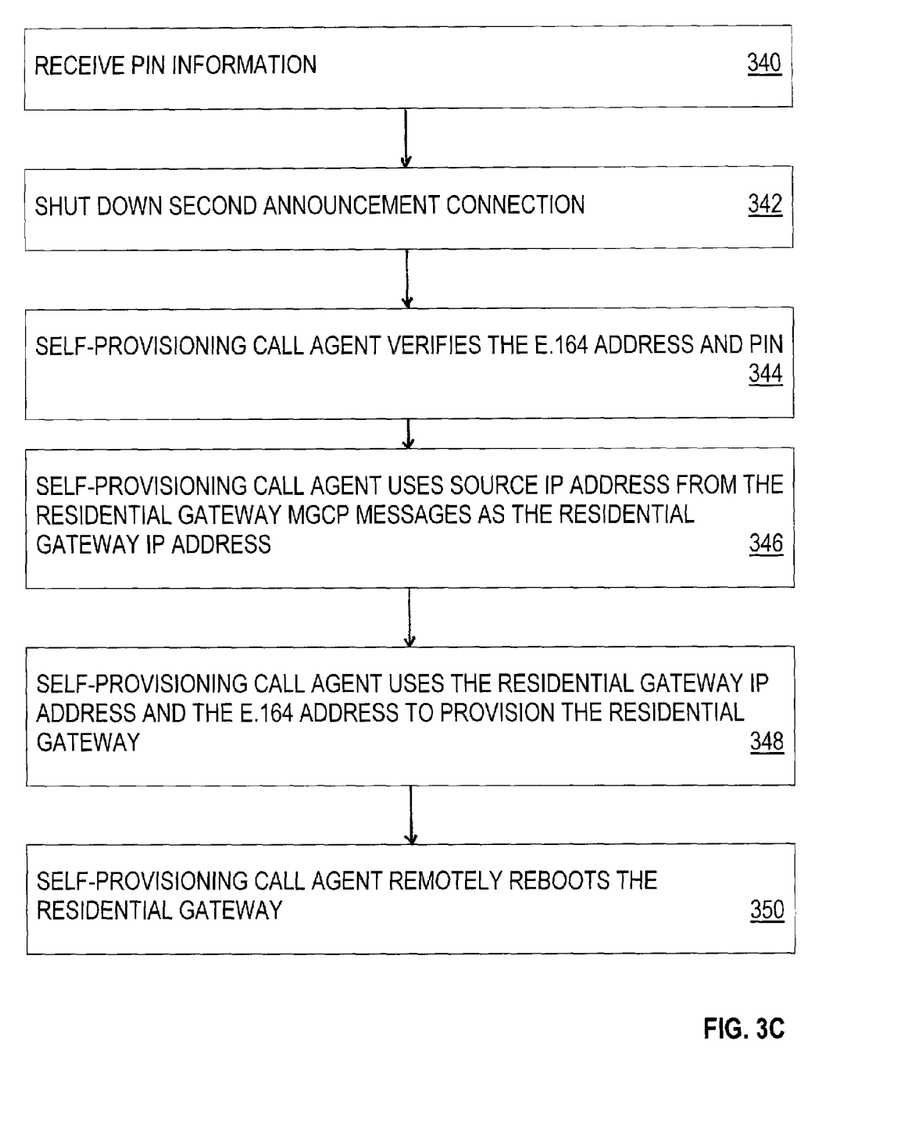
FIG. 3C is a flowchart of further steps in the method of FIG. 3A.

FIG. 3A is a flowchart of a portion of a method for self-provisioning a residential gateway that has not been provisioned. FIG. 3B and FIG. 3C are flowcharts of further steps in the method of FIG. 3A. For purposes of illustrating an example, FIG. 3A, FIG. 3B, and FIG. 3C are described herein with reference to elements in FIG. 2; however, the methods described herein are not limited to the context of FIG. 2.

At block 302 FIG. 3A, a residential gateway boots. For example, the subscriber boots residential gateway 202 on access network 208 of FIG. 2. When residential gateway 202 boots, the provider's protocol server, such as DHCP server 224 of FIG. 2, does not recognize residential gateway 202 because residential gateway 202 is yet un-provisioned. Thus, at block 304, a limited access IP address, location of one or more DNS servers, and the endpoint name of a self-provisioning call agent are provided. In one embodiment, subscriber registration center 220 offers such information to residential gateway 202 through DHCP server 224.

At block 306, an MGCP notify command is received. For example, the subscriber installs a standard phone set such as telephone 204 of FIG. 2 into the RJ-11 port of residential gateway 202 and lifts the receiver of telephone 204. The lifting of the receiver of telephone 204 is an "off-hook" event that causes residential gateway 202 to send an MGCP notify command to self-provisioning call agent 216. Self-provisioning call agent 216 acknowledges the notify command from residential gateway 202.

In block 308, a notification request is sent to collect a provisioning access number. According to certain embodiments, self-provisioning call agent 216 sends to residential gateway 202 an MGCP notification request command with a digit map, which digit map is a dial string pattern, for collecting a provisioning access number from the subscriber via residential gateway 202. The provisioning access number is collected in order to start the self-provisioning operation. In certain other embodiments, a provisioning access number need not be collected to start the self-provisioning operation.

At block 310, a notify command with dialed digits is received. For example, when the subscriber dials the provisioning access number, residential gateway 202 sends an MGCP notify command with the dialed digits to self-provisioning call agent 216. In response, self-provisioning call agent 216 acknowledges the MGCP notify command. If the subscriber abruptly hangs up the telephone receiver or flashes the connection at any time during the self-provisioning operation, the accumulated subscriber information is lost.

At block 312, a first VoIP connection is created. For example, self-provisioning call agent 216 sends an MGCP create connection command to residential gateway 202. In response, residential gateway 202 acknowledges the MGCP create connection command. The MGCP create connection command of block 312 sets up the first VoIP connection on residential gateway 202 to announcement server 214. In certain embodiments in which announcement server 214 is not a subsystem of the self-provisioning call agent 216, then self-provisioning call agent 216 sends an MGCP create connection command to the announcement server 214 as well.

At block 320 of FIG. 3B, an audible prompt message is transmitted. In one embodiment, announcement server 214 transmits the first VoIP message to residential gateway 202 using the first VoIP connection. For example, announcement server 214 may send a voice message such as, "Welcome to provider Acme. Please enter your ten-digit phone number now."

At block 322, a request to collect an E.164 address is sent. For example, self-provisioning call agent 216 sends an MGCP notification request command to residential gateway 202 to collect the ten-digit form of the E.164 address from the subscriber. Self-provisioning call agent 216 sends the MGCP notification request command of block 322 to residential gateway 202 at about the same time that announcement server 214 transmits the first VoIP message to residential gateway 202.

At block 324, an E.164 address is received. In one embodiment, the subscriber dials the ten-digit form of the E.164 address and residential gateway 202 sends an MGCP notify command with the dialed digits, which are received at self-provisioning call agent 216. In response, self-provisioning call agent 216 acknowledges the MGCP notify command with the dialed digits.

At block 326, the first VoIP connection is shut down. For example, self-provisioning call agent 216 sends an MGCP delete connection command to residential gateway 202 to shut down the first VoIP connection that was created at block 312. In response, residential gateway 202 acknowledges the MGCP delete connection command of block 326 and shuts down the first VoIP connection.

At block 328, a second VoIP connection is created. In one embodiment, self-provisioning call agent 216 sends an MGCP create connection command to residential gateway 202. In response, residential gateway 202 acknowledges the MGCP create connection command. The MGCP create connection command of block 328 sets up the second VoIP connection on residential gateway 202 to announcement server 214. In certain embodiments in which announcement server 214 is not a subsystem of the self-provisioning call agent 216, then self-provisioning call agent 216 sends an MGCP create connection command to the announcement server 214 as well.

At block 330, an audible prompt for a PIN is sent. For example, announcement server 214 transmits a second VoIP message to residential gateway 202 using the second VoIP connection. For example, announcement server 214 may send a VoIP message such as, "Thank you. Please enter your six-digit Personal Identification Number now."

At block 332, a request to collect PIN information is sent. For example, self-provisioning call agent 216 sends an MGCP notification request command to residential gateway 202 to collect a Personal Identification Number (PIN) from the subscriber. Self-provisioning call agent 216 sends the MGCP notification request command of block 332 to residential gateway 202 at about the same time that announcement server 214 transmits the second VoIP message to residential gateway 202.

At block 340 of FIG. 3C, PIN information is received. In one embodiment, the subscriber dials the PIN and residential gateway 202 sends an MGCP notify command with the dialed digits to self-provisioning call agent 216. In response, self-provisioning call agent 216 acknowledges the MGCP notify command with the dialed digits.

At block 342, the second connection is shut down. For example, self-provisioning call agent 216 sends an MGCP delete connection command to residential gateway 202 to shut down the second VoIP connection. In response, residential gateway 202 acknowledges the MGCP delete connection command of block 342 and shuts down the second VoIP connection.

At block 344 self-provisioning call agent 216 verifies the E.164 address and PIN using authentication database 218. In certain embodiments, authentication database 218 is an internal database of self-provisioning system 212. In certain other embodiments, authentication database 218 may be external to self-provisioning system 212, in which case, self-provisioning call agent 216 can verify the E.164 address and PIN using a Remote Authentication Dial In User Service (RADIUS) access-request message. RADIUS is a standards-based protocol for authentication, authorization, and accounting (AAA) systems.

At block 346, self-provisioning call agent 216 uses the source IP address from the MGCP messages sent from residential gateway 202 as the residential gateway IP address for residential gateway 202.

At block 348, self-provisioning call agent 216 uses the residential gateway IP address for residential gateway 202 and the E.164 address to provision residential gateway 202 for the subscriber. For example, self-provisioning call agent 216 may query DHCP server 224 for the mapping between the residential gateway IP address of residential gateway 202 and the MAC address of residential gateway 202. Next, self-provisioning call agent 216 may configure DHCP server 224 to associate the DNS hostnames that is based on E.164 address with the MAC address of residential gateway 202 and to offer to residential gateway 202 the following: 1) a long-term IP address, 2) the DNS location of one or more DNS servers, and 3) the MGCP endpoint name of standard call agent 228.

In certain embodiments, after self-provisioning call agent 216 provisions residential gateway 202, self-provisioning call agent 216 may use the create connection/delete connection MGCP command sequence as described herein in order to send a final VoIP message from announcement server 214. For example announcement server 214 may send an announcement such as "Thank you for choosing provider Acme for your telephone service." As before, the VoIP connection is shut down after the announcement.

At block 350, self-provisioning call agent 216 remotely reboots residential gateway 202. When residential gateway 202 reboots, residential gateway 202 receives the long-term IP address, the location of one more DNS servers, and the endpoint name of standard call agent 228, thus completing the provisioning of residential gateway 202.

The first time that the subscriber makes an outbound telephone call after residential gateway 202 is provisioned, standard call agent 228 finds an open port on trunking gateway 234, which port is for accepting outbound calls from residential gateway 202 and is assigned to residential gateway 202. Standard call agent 228 instructs residential gateway 202 to create a connection between residential gateway 202 and trunking gateway 234 using the assigned port. Standard call agent 228 also informs trunking gateway 234 of the port number on residential gateway 202, which is used for the connection between residential gateway 202 and trunking gateway 234. Once the connection between residential gateway 202 and trunking gateway 234 is set up, normal VoIP traffic can begin using the connection between residential gateway 202 and trunking gateway 234.

Thus, a self-provisioning approach has been described. A subscriber with an un-provisioned broadband residential gateway can request service and provide an address and PIN that uniquely identify the location of the gateway. The address and PIN are authenticated. Based on the address and PIN, an association is made among an IP address and a MAC address of the gateway, resulting in selection of a permanent IP address for the gateway.

For the purpose of explanation, certain embodiments are described herein in the context of MGCP protocol. It will be apparent, however, to one skilled in the art that the present invention may be practiced using other protocols such as H.323 and Session Initiation Protocol (SIP) as defined by RFC 2543.

3.0 Hardware Overview

Figure 4:
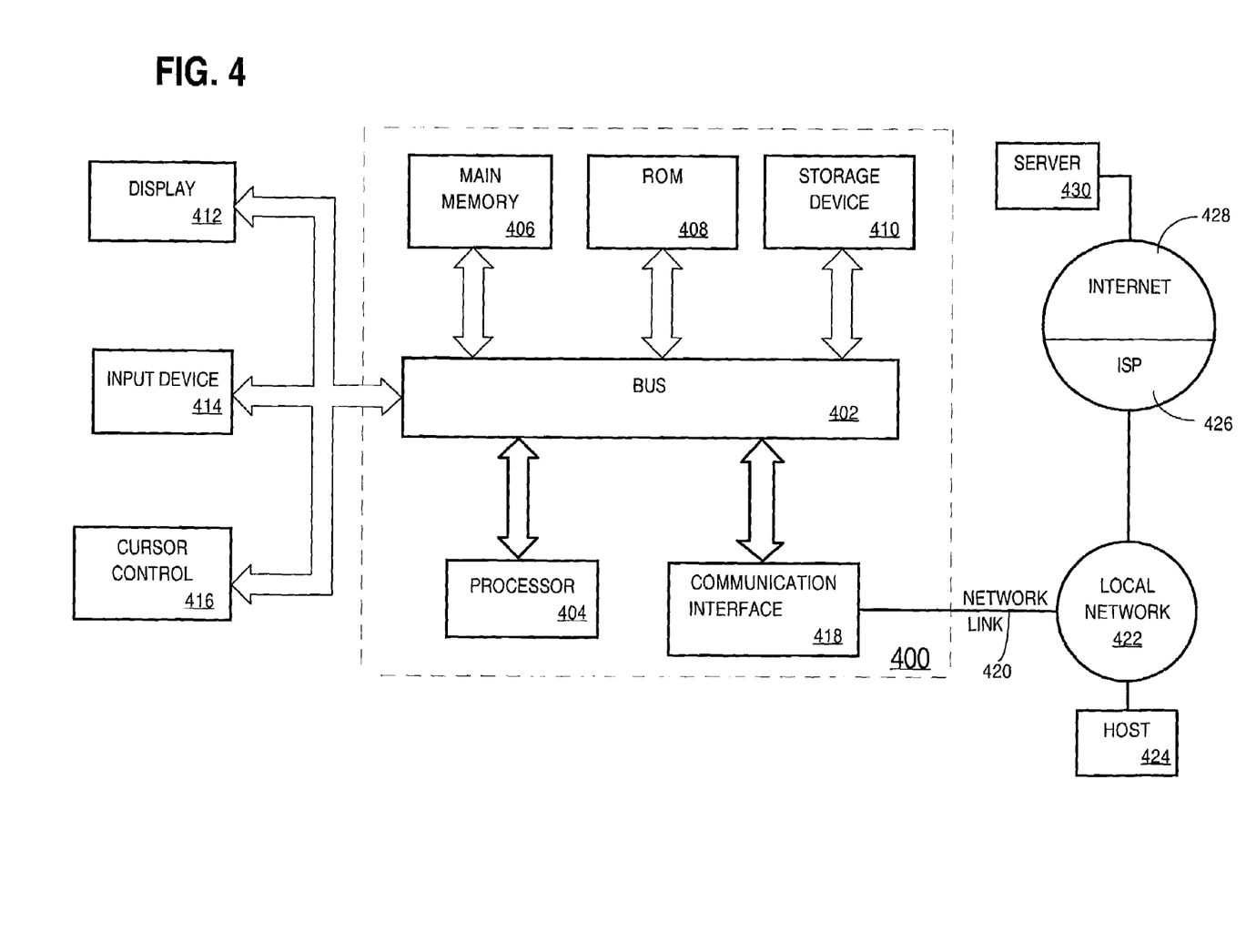
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing self-provisioning of VoIP telephony service to a subscriber of the VoIP telephony service, the method comprising the computer-implemented steps of:
    receiving a first notify command from an un-provisioned residential gateway that is associated with the subscriber, wherein the first notify command is sent in response to a telephone receiver connected to the residential gateway going off-hook;
    instructing the residential gateway to collect a provisioning access number;
    instructing, via a call signaling command, the residential gateway to collect a subscriber numeric identity that uniquely identifies the subscriber;
    instructing, via a call signaling command, the residential gateway to collect a Personal Identification Number (PIN) information that is associated with the subscriber;
    receiving and verifying the subscriber numeric identity and Personal Identification Number (PIN) information;
    assigning an IP address that is associated with one or more Media Gateway Control Protocol (MGCP) messages that are sent by the residential gateway as a residential gateway IP address for the residential gateway; and
    using the residential gateway IP address to provision the residential gateway that is associated with the subscriber.

2. The method as recited in claim 1, wherein instructing the residential gateway to collect a provisioning access number further comprises sending a MGCP notification request with a first digit map associated with the provisioning access number.

3. A method for providing self-provisioning of VoIP telephony service to a subscriber of the VoIP telephony service, the method comprising the computer-implemented steps of:
    instructing, via a call signaling command the residential gateway to collect a subscriber numeric identity that uniquely identifies the subscriber;
    instructing, via a call signaling command, the residential gateway to collect a Personal Identification Number (PIN) information that is associated with the subscriber;
    wherein instructing the residential gateway to collect a Personal Identification Number includes
        after the residential gateway deletes a first VoIP connection, instructing the residential gateway to create a second VoIP connection between the residential gateway and an announcement server for sending a second VoIP message from the announcement server to the subscriber via the residential gateway in order to collect the Personal Identification Number (PIN) information from the subscribers
    receiving and verifying the subscriber numeric identity and Personal Identification Number (PIN) information;
    assigning an IP address that is associated with one or more Media Gateway Control Protocol (MGCP) messages that are sent by the residential gateway as a residential gateway IP address for the residential gateway, and
    using the residential gateway IP address to provision the residential gateway that is associated with the subscriber.

4. The method as recited in claim 3, further comprising the steps of:
    receiving and storing a provisioning access number from the residential gateway; and
    wherein instructing the residential gateway to collect a subscriber numeric identity includes instructing the residential gateway to create a first VoIP connection between the residential gateway and an announcement server for sending a first VoIP message from the announcement server to the subscriber via the residential gateway in order to collect the subscriber numeric identity.

5. The method as recited in claim 4, further comprising the step of:
    receiving and storing the subscriber numeric identity from the residential gateway; and
    instructing the residential gateway to delete the first VoIP connection.

6. The method as recited in claim 3, further comprising the step of:
    receiving and storing the Personal Identification Number (PIN) information; and
    instructing the residential gateway to delete the second VoIP connection.

7. A method for providing self-provisioning of VoIP telephony service to a subscriber of the VoIP telephony service, the method comprising the computer-implemented steps of:
    instructing, via a call signaling command, the residential gateway to collect a subscriber numeric identity that uniquely identifies the subscriber;
    instructing, via a call signaling command, the residential gateway to collect a Personal Identification Number (PIN) information that is associated with the subscriber;
    receiving and verifying the subscriber numeric identity and Personal Identification Number (PIN) information;
    assigning an IP address that is associated with one or more Media Gateway Control Protocol (MGCP) messages that are sent by the residential gateway as a residential gateway IP address for the residential gateway; and
    using the residential gateway IP address to provision the residential gateway that is associated with the subscriber;
    wherein using the residential gateway IP address to provision the residential gateway further comprises rebooting the residential gateway remotely by a self-provisioning system call agent of a self-provisioning system that is associated with a provider of the VoIP telephony service.

8. A method for providing self-provisioning of VoIP telephony service to a subscriber of the VoIP telephony service, the method comprising the computer-implemented steps of:
    a residential gateway requesting a location of one or more Domain Name System (DNS) server, a limited-access IP address, and a Media Gateway Control Protocol (MGCP) endpoint name of a self-provisioning system call agent of a self-provisioning system that is associated with the provider of the VoIP telephony service;
    instructing, via a call signaling command, the residential gateway to collect a subscriber numeric identity that uniquely identifies the subscriber;

instructing, via a call signaling command, the residential gateway to collect a Personal Identification Number (PIN) information that is associated with the subscriber;

receiving and verifying the subscriber numeric identity and Personal Identification Number (PIN) information;

assigning an IP address that is associated with one or more Media Gateway Control Protocol (MGCP) messages that are sent by the residential gateway as a residential gateway IP address for the residential gateway; and using the residential gateway IP address to provision the residential gateway that is associated with the subscriber.

9. A method for providing self-provisioning of VoIP telephony service to a subscriber of the VoIP telephony service, the method comprising the computer-implemented steps of:

using a subscriber registration center that is associated with a provider of the VoIP telephony service wherein the subscriber registration center performs the steps of:
offering to a residential gateway a limited access IP address;
offering to the residential gateway a location of one or more Domain Name System (DNS) servers;
offering to the residential gateway a Media Gateway Control Protocol (MGCP) endpoint name of a self-provisioning system call agent of a self-provisioning system that is associated with the provider of the VoIP telephony service;
instructing, via a call signaling command, the residential gateway to collect a subscriber numeric identity that uniquely identifies the subscriber;
instructing, via a call signaling command, the residential gateway to collect a Personal Identification Number (PIN) information that is associated with the subscriber;
receiving and verifying the subscriber numeric identity and Personal Identification Number (PIN) information;
assigning an IP address that is associated with one or more Media Gateway Control Protocol (MGCP) messages that are sent by the residential gateway as a residential gateway IP address for the residential gateway; and
using the residential gateway IP address to provision the residential gateway that is associated with the subscriber.

10. The method as recited in claim 9, wherein the step of offering to the residential gateway a limited access IP address is performed through a Dynamic Host Configuration Protocol (DHCP) server.

11. The method as recited in claim 9, wherein the step of offering to the residential gateway a location of one or more Domain Name System (DNS) servers is performed through a Dynamic Host Configuration Protocol (DHCP) server.

12. The method as recited in claim 9, wherein the step of offering to the residential gateway a Media Gateway Control Protocol (MGCP) endpoint name of a self-provisioning system call agent of a self-provisioning system that is associated with the provider of the VoIP telephony service is performed through a Dynamic Host Configuration Protocol (DHCP) server.

13. The method as recited in claim 9, wherein a protocol server directs a provisioned residential gateway to a standard call agent that is associated with the provider of the VoIP telephony service to enable VoIP calls and services.

14. A method for providing self-provisioning of VoIP telephony to a subscriber of a VoIP telephony service, the method comprising the computer-implemented steps of:

receiving a first notify command from a residential gateway that is associated with the subscriber and that has not been provisioned, wherein the first notify command is sent in response to a lifting of a telephone receiver connected to the residential gateway;

after receiving the first notify command from the residential gateway, instructing the residential gateway to collect a provisioning access number;

receiving a second notify command from the residential gateway, wherein the second notify command is sent with the provisioning access number;

receiving and storing the provisioning access number;

after receiving the second notify command, instructing the residential gateway to create a first VoIP connection between the residential gateway and an announcement server for sending a first VoIP message from the announcement server to the subscriber in order to collect a subscriber numeric identity that uniquely identifies the subscriber;

instructing the residential gateway to collect the subscriber numeric identity that is allocated to the subscriber;

receiving a third notify command from the residential gateway, wherein the third notify command is sent with the subscriber numeric identity;

receiving and storing the subscriber numeric identity;

after receiving the third notify command from the residential gateway, instructing the residential gateway to delete the first VoIP connection;

after the residential gateway deletes the first VoIP connection, instructing the residential gateway to create a second VoIP connection between the residential gateway and the announcement server for sending a second VoIP message from the announcement server to the subscriber in order to collect a Personal Identification Number (PIN) information from the subscriber;

instructing the residential gateway to collect the Personal Identification Number (PIN) information that is associated with the subscriber;

receiving a fourth notify command from the residential gateway, wherein the fourth notify command is sent with the Personal Identification Number (PIN) information;

receiving and storing the Personal Identification Number (PIN) information;

after receiving the fourth notify command from the residential gateway, instructing the residential gateway to delete the second VoIP connection;

verifying the subscriber numeric identity and PIN information;

using a source IP address that is associated with one or more Media Gateway Control Protocol (MGCP) messages that are sent by the residential gateway as a residential gateway IP address for the residential gateway; and using the residential gateway IP address to provision the residential gateway by performing the steps of:
enabling a Dynamic Host Configuration Protocol-centric (DHCP-centric) protocol server to query a Dynamic Host Configuration Protocol (DHCP) server for a mapping from the residential gateway IP address to a MAC address associated with the residential gateway;
enabling the DHCP-centric protocol server to configure the DHCP server to offer a long-term IP address to the residential gateway; and enabling the DHCP-centric protocol server to configure the DHCP server to associate a Domain Name System (DNS) hostname that is based on the subscriber numeric identity with the MAC address of the residential gateway.

15. A computer-readable medium carrying one or more sequences of instructions for providing self-provisioning of VoIP telephony to a subscriber of VoIP telephony service, which instructions, when executed by one or more processors, cause the one or more processors to carry out the steps of:
    instructing, via a call signaling command, an un-provisioned residential gateway that is associated with the subscriber to collect an subscriber numeric identity that uniquely identifies the subscriber;
    instructing, via a call signaling command, the residential gateway to collect a Personal Identification Number (PIN) information that is associated with the subscriber;
    receiving and verifying the subscriber numeric identity and Personal Identification Number (PIN) information;
    assigning an IP address that is associated with one or more Media Gateway Control Protocol (MGCP) messages that are sent by the residential gateway as a residential gateway IP address for the residential gateway;
    using the residential gateway IP address to provision the residential gateway that is associated with the subscriber; and
    wherein using the residential gateway IP address to provision the residential gateway further comprises rebooting the residential gateway remotely by a self-provisioning system call agent of a self-provisioning system that is associated with a provider of the VoIP telephony service.

16. An apparatus for providing self-provisioning of VoIP telephony to a subscriber of a VoIP telephony service, which apparatus, comprising:
    means for instructing, via a call signaling command, an un-provisioned residential gateway that is associated with the subscriber to collect an subscriber numeric identity that uniquely identifies the subscriber;
    means for instructing, via a call signaling command, the residential gateway to collect a Personal Identification Number (PIN) information that is associated with the subscriber;
    means for receiving and verifying the subscriber numeric identity and Personal Identification Number (PIN) information;
    means for assigning an IP address that is associated with one or more Media Gateway Control Protocol (MGCP) messages that are sent by the residential gateway as a residential gateway IP address for the residential gateway;
    means for using the residential gateway IP address to provision the residential gateway that is associated with the subscriber; and
    wherein the means for using the residential gateway IP address to provision the residential gateway further comprises means for rebooting the residential gateway remotely by a self-provisioning system call agent of a self-provisioning system that is associated with a provider of the VoIP telephony service.

17. An apparatus for providing self-provisioning of VoIP telephony to a subscriber of a VoIP telephony service, which apparatus, comprising:
    a network interface that is coupled to the data network for receiving one or more packet flows therefrom;
    a processor;
    one or more stored sequences of instructions which, when executed by the processor, cause the processor to carry out the steps of:
    instructing, via a call signaling command, an un-provisioned residential gateway that is associated with the subscriber to collect a subscriber numeric identity of the subscriber;
    instructing, via a call signaling command, the residential gateway to collect a Personal Identification Number (PIN) information that is associated with the subscriber;
    receiving and verifying the subscriber numeric identity and Personal Identification Number (PIN) information;
    assigning an IP address that is associated with one or more Media Gateway Control Protocol (MGCP) messages that are sent by the residential gateway as a residential gateway IP address for the residential gateway;
    using the residential gateway IP address to provision the residential gateway that is associated with the subscriber; and
    wherein using the residential gateway IP address to provision the residential gateway further comprises rebooting the residential gateway remotely by a self-provisioning system call agent of a self-provisioning system that is associated with a provider of the VoIP telephony service.

\* \* \* \* \*

UNITED STATES PATENT AND TRADEMARK OFFICE
CERTIFICATE OF CORRECTION

PATENT NO. : 7,046,659 B1
APPLICATION NO. : 09/898801
DATED : May 16, 2006
INVENTOR(S) : Richard Woundy Page 1 of 1

It is certified that error appears in the above-identified patent and that said Letters Patent is hereby corrected as shown below:

<u>Title page</u> Item 54, and Column 1.

Title should read:

CALL SIGNALING APPROACH TO USER SELF-PROVISIONING OF VOIP USING A TOUCH-TONE INTERFACE

In Column 11, line 61:

Delete "subscribers" and insert --subscriber;--

Signed and Sealed this

Fifteenth Day of August, 2006

JON W. DUDAS
*Director of the United States Patent and Trademark Office*